(12) United States Patent
Shiroya et al.

(10) Patent No.: US 12,055,179 B2
(45) Date of Patent: Aug. 6, 2024

(54) BALL SOCKET STRUCTURE

(71) Applicant: DAIDO METAL COMPANY LTD., Nagoya (JP)

(72) Inventors: Tomoyasu Shiroya, Inuyama (JP); Shigeyoshi Mori, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 269 days.

(21) Appl. No.: 17/579,703

(22) Filed: Jan. 20, 2022

(65) Prior Publication Data

US 2022/0260111 A1  Aug. 18, 2022

(30) Foreign Application Priority Data

Feb. 16, 2021  (JP) .................. 2021-022886

(51) Int. Cl.
*F16C 11/06* (2006.01)
*F16C 17/03* (2006.01)
*F16C 33/04* (2006.01)

(52) U.S. Cl.
CPC ...... *F16C 11/0628* (2013.01); *F16C 11/0685* (2013.01); *F16C 17/03* (2013.01); *F16C 33/043* (2013.01); *F16C 2206/04* (2013.01); *F16C 2223/60* (2013.01); *F16C 2240/70* (2013.01)

(58) Field of Classification Search
CPC .... F16C 11/0619–0657; F16C 11/0685; F16C 17/03; F16C 17/06; F16C 33/043; F16C 2206/04; F16C 2223/60; F16C 2240/70
See application file for complete search history.

(56) References Cited

U.S. PATENT DOCUMENTS

| 4,039,228 | A | * | 8/1977 | Repose | .................. | F16C 17/03 |
| | | | | | | 384/312 |
| 5,743,657 | A | | 4/1998 | O'Reilly et al. | | |
| 8,016,889 | B2 | * | 9/2011 | Dixon | .................. | A61F 2/4425 |
| | | | | | | 623/17.14 |
| 8,371,756 | B2 | | 2/2013 | Waki et al. | | |
| 10,077,803 | B2 | | 9/2018 | Choi | | |
| 10,428,416 | B2 | * | 10/2019 | Moriguchi | .......... | C23C 14/0605 |
| 2010/0142870 | A1 | | 6/2010 | Waki et al. | | |

(Continued)

FOREIGN PATENT DOCUMENTS

| JP | H10-503827 A | | 4/1998 | | |
| JP | 2007232092 A | * | 9/2007 | ............ | F16C 23/045 |

(Continued)

OTHER PUBLICATIONS

Extended European Search Report issued in corresponding EP Application No. 22154139.4, mailed on Jun. 28, 2022, 9 pages.

*Primary Examiner* — Alan B Waits
(74) *Attorney, Agent, or Firm* — Snyder, Clark, Lesch & Chung, LLP

(57) ABSTRACT

A ball socket structure is provided, which includes a ball portion and a socket portion, the ball portion and the socket portion being configured to slide against one another, in which the socket portion includes a sliding surface including a PVD coating layer, the sliding surface of the socket portion is a concave spherical surface, and a value (Ds/Rs) of a ratio between a depth Ds of the sliding surface and a radius of curvature Rs of the sliding surface is from 0.05 to 0.70.

20 Claims, 6 Drawing Sheets

(56) References Cited

U.S. PATENT DOCUMENTS

2016/0265584 A1    9/2016  Ichikawa et al.
2018/0003219 A1    1/2018  Choi
2022/0018388 A1*   1/2022  Matsumoto ............. F16C 25/02

FOREIGN PATENT DOCUMENTS

| JP | 2010-116956 A | | 5/2010 | |
| JP | 2018-004073 A | | 1/2018 | |
| JP | 2018004073 A | * | 1/2018 | ............. F16C 17/03 |
| JP | 2018-159126 A | | 10/2018 | |
| WO | 0154561 A2 | | 8/2001 | |
| WO | WO-2010055847 A1 | * | 5/2010 | ............. F16C 17/03 |

* cited by examiner

BALL SOCKET STRUCTURE

CROSS REFERENCE TO RELATED APPLICATIONS

This application claims the benefit of priority to Japanese Patent Application Number 2021-22886 filed on Feb. 16, 2021. The entire contents of the above-identified application are hereby incorporated by reference.

TECHNICAL FIELD

The disclosure relates to enhancement of a ball socket structure.

BACKGROUND

A ball socket structure may be used in a tilting pad bearing, which is used in a journal bearing. A socket portion of the ball socket structure is fixed to a housing of the journal bearing, and pads are disposed on a ball portion that slides along the socket portion. These pads are tiltable. For a tilting pad bearing with such a configuration, typically the sliding surface of the ball portion and the sliding surface of the socket portion are both made of a bearing metal.

Since both the sliding surface of the ball portion and the sliding surface of the socket portion are made of metal, the space between these sliding surfaces needs to be supplied with lubricating oil. In known technology relating to this, a (point-shaped, groove-shaped) recessed portion for collecting lubricating oil is formed in at least one of the sliding surfaces (see JP 2018-004073 A). Providing such a recessed portion achieves the following effects. As both the sliding surfaces slide against one another, the lubricating oil collected in the recessed portion is drawn up into the space between both the sliding surfaces, allowing sliding performance between the two sliding surfaces to be maintained. In this manner, the pads disposed on the ball portion can be given a favorable tilting function.

For other technologies relating to the disclosure, see JP H10-503827 A, page 18, and JP 2010-116956 A.

SUMMARY

According to the research of the present inventors, the following problem arose in a case where a recessed portion for collecting lubricating oil is formed in the sliding surface of the ball portion or the sliding surface of the socket portion.

The region where the recessed portion is formed does not contribute to sliding between the sliding surfaces of the ball portion and the socket portion. In other words, providing the recessed portion results in a smaller effective area of both sliding surfaces than in a structure without a recessed portion, which leads to an increase in the coefficient of friction.

The tilt angle required for the pads disposed in the circumferential direction of the axis of the journal bearing is very small (for example, approximately 0.1 degree), and, as a result, the amount that the sliding surface of the ball portion slides against the sliding surface of the socket portion is also very small. If the amount of sliding is very small as described, the amount of lubricating oil drawn up into the space between both the sliding surfaces from the recessed portion for collecting lubricating oil may be insufficient, and this may cause the coefficient of friction to increase.

The disclosure solves the above-described problem, and a first aspect is defined as follows.

A ball socket structure includes a ball portion and a socket portion, the ball portion and the socket portion being configured to slide against one another, wherein the socket portion includes a sliding surface including a PVD coating layer, the sliding surface of the socket portion is a concave spherical surface, and a value (Ds/Rs) of a ratio between a depth Ds of the sliding surface and a radius of curvature Rs of the sliding surface is from 0.05 to 0.70.

In the bearing of the first aspect defined in this manner, as illustrated in FIG. 1A, the value (Ds/Rs) of the ratio between the depth Ds of a sliding surface 43a and the radius of curvature Rs of the sliding surface 43a in a socket portion 43 is set to from 0.05 to 0.70. In other words, the sliding surface 43a is a relatively shallow concave spherical surface. Accordingly, when particles generated from an evaporation source or plasma collide with the metal socket portion 43 serving as a negative electrode, the particles are more likely to collide with the entire region of the sliding surface 43a.

Note that if the value (Ds/Rs) of the ratio is greater than 0.70, the sliding surface 43a of the socket portion 43 is too deep, and the particles may not collide at deep positions of the sliding surface 43a with sufficient energy. On the other hand, if the value (Ds/Rs) of the ratio is less than 0.05, the sliding surface 43a is too shallow, which is not preferable. In other words, when the sliding surface 43a is shallow, to enable a ball portion 41 to rotate and pads 20 (see FIG. 4) supported by the ball portion 41 to tilt effectively, the sliding surface 43a needs to have a large area. This increases the size of the ball socket structure.

From the perspective of ease of processing, the value (Ds/Rs) of the ratio is more preferably from 0.3 to 0.6. The most preferred value of the ratio is from 0.4 to 0.6.

Here, when a physical vapor deposition (herein referred to as "PVD") process is performed, as first preprocessing, plasma cleaning of the growth target surface is typically performed. Because the sliding surface 43a is formed as a shallow surface, plasma such as Ar+ collides uniformly with the entire region of the concave spherical surface. Thus, the entire surface of the concave spherical surface is reliably and uniformly cleaned, and a PVD coating layer 433 subsequently layered by a PVD process uniformly adheres (see FIG. 1B). That is, sufficient adhesion can be ensured between the PVD coating layer 433 and a base 431 of the socket portion 43.

Naturally, the particles of the material of the PVD coating layer 433 layered by the PVD process also collide with the concave spherical surface uniformly and form a layer thereon, giving the PVD coating layer 433 a uniform film thickness and density.

The material of the PVD coating layer 433 is a material for forming a solid sliding layer of a bearing sliding surface and has properties such as high lubricity and wear resistance. Examples of such materials include, but are not limited to, DLC and CrN as used in the Examples, as well as CrC, SiC, SiN, TiN, and TiC.

In this manner, by providing the sliding surface 43a of the socket portion 43 with the PVD coating layer 433, the coefficient of friction between the sliding surface 43a and a sliding surface 41a of the ball portion 41 can be reduced without providing any recessed portions for collecting lubricating oil. The PVD coating layer 433 is preferably formed on the entire surface of the sliding surface 43a of the socket portion 43, but it is sufficient that the PVD coating layer 433 be formed on only the portion of the sliding surface 43a of the socket portion 43 that comes into contact with the ball portion 41.

The PVD coating layer 433 has uniform film thickness and density, which makes it possible to achieve a thin film with high durability.

A second aspect of the disclosure is defined as follows. The ball socket structure as defined in the first aspect has a configuration in which the sliding surface of the socket portion includes a chamfered outer periphery.

According to the ball socket structure of the second aspect defined in this manner, as illustrated in FIG. 2A, the outer periphery of the sliding surface 43a of the socket portion 43 is chamfered, meaning that the edge is removed from the socket portion 43 serving as the negative electrode with which the particles collide. Herein, the outer periphery of the sliding surface 43a refers to the portion of the concave spherical surface having the maximum diameter. By chamfering in this manner, the electric field at the portion is made stable, and the collision of particles is made stable and uniform. This makes the film thickness and density of the PVD coating layer 433 more uniform across the entire surface of the sliding surface 43a.

A value (Rc/Rs) of a ratio between a chamfer radius of curvature Rc of the chamfered portion and the radius of curvature Rs of the sliding surface 43a or a value (Dc/Rs) of a ratio between the radius of curvature Rs and a depth Dc of a chamfered surface is preferably 0.02 or greater (third aspect). By setting the value of these ratios to 0.02 or greater, a disturbance in the electric field caused by an edge effect can be suppressed. When the value of the ratio (Rc/Rs or Dc/Rs) is less than 0.02, the chamfer radius of curvature of the chamfered portion is too small and an edge effect may occur, leading to a disturbance in the electric field in the vicinity of the portion.

The chamfer radius of curvature Rc refers to the radius of curvature of the cross-section when the chamfered surface of the chamfered portion is formed with a hemispherical cross-section bulging outward.

The shape of the chamfer is not limited to a curved surface as described above, and the shape is only required to suppress disturbance in the electric field. For example, as illustrated in FIG. 2B, an angle Ac of the planar chamfered surface may be 60 degrees or less.

A fourth aspect of the disclosure is defined as follows. That is, the ball socket structure as defined in any one of the first to third aspects has a configuration in which the socket portion includes a through hole formed in a central portion of the socket portion.

Herein, the central portion of the socket portion refers to the deepest portion in the sliding surface.

According to the ball socket structure of the fourth aspect defined in this manner, as illustrated in FIG. 3, a through hole 48 is formed at the deepest position in the sliding surface 43a of the socket portion 43, causing a strong electric field to be generated around an opening portion 48c of the through hole 48. This can compensate for the intensity of the electric field at the deepest position of the sliding surface 43a where the intensity of the electric field tends to be weak.

Furthermore, as illustrated in FIG. 4, the through hole 48 preferably includes the opening portion 48c with a chamfered peripheral edge to stabilize the electric field at the peripheral edge of the opening portion 48c (fifth aspect). The degree of chamfering can be the same as that of the outer periphery of the sliding surface 43a.

A sixth aspect of the disclosure is defined as follows: the ball socket structure as defined in any one of the first to fifth aspects has a configuration in which the PVD coating layer includes diamond-like carbon (herein, also abbreviated to DLC).

According to the ball socket structure of the sixth aspect defined in this manner, the PVD coating layer 433 is made of DLC, giving the PVD coating layer 433 the high durability property of the DLC.

A seventh aspect of the disclosure is defined as follows. The ball socket structure as defined in any one of the first to sixth aspects has a configuration in which the PVD coating layer has a thickness of from 0.001 to 0.300% of a wall thickness Ts of the central portion of the socket portion.

Herein, the central portion of the socket portion 43 refers to the deepest portion in the sliding surface 43a as described above. In other words, the central portion is the portion of the socket portion 43 with the thinnest wall thickness. Thus, as defined in the seventh aspect, by setting the thickness of the PVD coating layer 433 to be from 0.001 to 0.300% of the wall thickness Ts of the central portion of the socket portion 43, the mechanical strength required for the socket portion 43 is ensured and the film thickness required for the PVD coating layer 433 is also ensured.

Here, if the ratio of the thickness of the PVD coating layer 433 in the central portion of the socket portion 43 is less than 0.001%, the PVD coating layer 433 is too thin and its film thickness service life is reduced. On the other hand, if the ratio of the thickness of the PVD coating layer 433 is greater than 0.300%, the PVD coating layer 433 is unnecessarily thick and the proportion of the base in the central portion of the socket portion 43 is reduced, reducing rigidity. As a result, the mechanical strength is reduced.

The ratio of the thickness of the PVD coating layer 433 in the central portion of the socket portion 43 is more preferably from 0.010 to 0.100%. The most preferred ratio is from 0.020 to 0.050%. This makes adjusting the wall thickness of the PVD coating layer 433 easier.

An eighth aspect of the disclosure is defined as follows. That is, the ball socket structure defined in any of the first to seventh aspects has a configuration in which the ball portion includes a sliding surface including a PVD coating layer, and the PVD coating layer has a thickness of from 0.001 to 0.300% of a wall thickness Tb of a central portion of the ball portion.

According to the eighth aspect defined in this manner, as illustrated in FIG. 1B, a PVD coating layer 413 is also layered on the sliding surface 41a of the ball portion 41. This, together with the PVD coating layer 433 of the sliding surface 43a of the socket portion 43, helps reduce the coefficient of friction of the ball socket structure.

By setting the thickness of the PVD coating layer 413 to be from 0.001 to 0.300% of the wall thickness Tb of the central portion of the ball portion 41, the mechanical strength required for the ball portion 41 can be ensured and the film thickness required for the PVD coating layer 413 can also be ensured.

Herein, the central portion of the ball portion 41 refers to a portion of the ball portion 41 that faces the central portion of the socket portion 43 when in an unloaded state. Here, when the ratio of the thickness of the PVD coating layer 413 in the central portion of the ball portion 41 is less than 0.001%, the PVD coating layer 413 may be too thin and have insufficient durability. On the other hand, if the ratio of the thickness of the PVD coating layer 413 is greater than 0.300%, the PVD coating layer 413 is unnecessarily thick and the central portion of the ball portion 41 is too thin, meaning that the mechanical strength may be insufficient.

The ratio of the thickness of the PVD coating layer 413 in the central portion of the ball portion 41 is more preferably from 0.010 to 0.030%. The most preferred ratio is from 0.010 to 0.025%.

A ninth aspect of the disclosure is defined as follows. A manufacturing method for a socket portion of a ball socket structure including a ball portion and the socket portion, the ball portion and the socket portion being configured to slide against one another includes: preparing a base of a socket portion made of metal, the base including a concave spherical surface as a sliding surface and having a value (Ds/Rs) of a ratio between a depth Ds of the concave spherical surface and a radius of curvature Rs of the concave spherical surface of from 0.05 to 0.70; performing first preprocessing of plasma cleaning the concave spherical surface of the base; performing second preprocessing of layering a primer layer on the concave spherical surface that is plasma-cleaned via a PVD process; and layering diamond-like carbon on the primer layer via a PVD process.

According to the manufacturing method defined in the ninth aspect described above, a value (Ds/Rs) of the ratio between a depth Ds of the concave spherical surface of a base 431 of the socket portion 43 and the radius of curvature Rs is from 0.05 to 0.70. In other words, the concave spherical surface of the base 431 has a shallow shape. Accordingly, when particles generated from an evaporation source or plasma collide with the base 431 of the metal socket portion 43 serving as a negative electrode, the particles tend to collide with the entire region of the concave spherical surface.

When a PVD process is performed, as a first preprocessing, plasma cleaning of the growth target surface is typically performed. Here, according to the manufacturing method defined in the ninth aspect, because the concave spherical surface of the base 431 of the socket portion 43 is formed as a shallow surface, the Ar+ particles or the like generated by the plasma collide uniformly across the entire region of the concave spherical surface. Thus, the entire surface of the concave spherical surface of the base 431, which is the growth target surface, is cleaned reliably and uniformly.

When subsequently layering the primer layer (second preprocessing), the particles forming the primer layer collide uniformly on the plasma-cleaned concave spherical surface, so the film thickness and the density of the primer layer are uniform across the entire surface of the concave spherical surface. Examples of materials for such a primer layer include Ti, Cr, W, Ni, NiCr, Si, Zr, Ta, and Mo.

Furthermore, even when subsequently layering the diamond-like carbon layer (layering), the particles forming the diamond-like carbon layer uniformly collide with the primer layer of the concave spherical surface, so the film thickness and the density of the diamond-like carbon layer is uniform across the entire surface of the primer layer.

A manufacturing method according to a tenth aspect of the disclosure is defined as follows. That is, in the manufacturing method defined in the ninth aspect, in the preparing, the concave spherical surface of the base includes a chamfered outer periphery.

According to the manufacturing method according to the tenth aspect defined in this manner, the concave spherical surface of the base 431 includes the chamfered outer periphery. Thus, the electric field is made stable, and when the base 431 is used as the negative electrode, the particles collide in a stable and uniform manner. Thus, the first preprocessing, the second preprocessing, and the layering are performed stably on the entire surface of the concave spherical surface.

Note that an eleventh aspect is defined as follows: the value (Rc/Rs) of a ratio between a chamfer radius of curvature Rc of the chamfered portion and the radius of curvature Rs of the sliding surface 43a or a value (Dc/Rs) of a ratio between the radius of curvature Rs and a depth Dc of a chamfered surface is preferably 0.02 or greater. By setting the value of these ratios (Rc/Rs or Dc/Rs) to 0.02 or greater, disturbance in the electric field caused by an edge effect can be suppressed.

A twelfth aspect of the disclosure is defined as follows. That is, in the manufacturing method defined in any one of the ninth to eleventh aspects, in the preparing, the concave spherical surface includes the through hole 48 formed in the central portion of the concave spherical surface.

According to the manufacturing method of the twelfth aspect defined in this manner, the through hole 48 is formed at the deepest position in the base 431. Thus, when the base 431 is used as a negative electrode, a strong electric field is generated around the opening portion 48c of the through hole 48. Accordingly, the particles can collide stably even at the deep locations of the concave spherical surface.

Furthermore, a thirteenth aspect is defined as follows: the through hole 48 preferably includes the opening portion 48c with a chamfered peripheral edge to stabilize the electric field at the peripheral edge of the opening portion 48c.

A fourteenth aspect of the disclosure is defined as follows. That is, in the manufacturing method defined in any one of the ninth to thirteenth aspects, in the layering, the layer of diamond-like carbon is given a thickness of from 0.001 to 0.300% of the wall thickness Ts of the central portion of the socket portion.

According to the manufacturing method of the fourteenth aspect defined in this manner, by setting the thickness of the PVD coating layer 433 to be from 0.001 to 0.300% of the wall thickness Ts of the central portion of the socket portion 43, the mechanical strength required for the socket portion 43 is ensured and the film thickness required for the PVD coating layer 433 is also ensured.

A fifteenth aspect of the disclosure is defined as follows. That is, a manufacturing method for a ball socket structure includes: preparing a socket portion manufactured using the manufacturing method according to any one of the ninth to fourteenth aspects; preparing a ball portion; and placing the ball portion in the socket portion.

In the ball socket structure manufactured in this manner, the PVD coating layer 433 made of diamond-like carbon is provided in the socket portion 43. Thus, the coefficient of friction between the sliding surface 41a of the ball portion 41 and the sliding surface 43a of the socket portion 43 can be reduced.

BRIEF DESCRIPTION OF DRAWINGS

FIG. 2A illustrates a chamfer with a spherical shaped cross-section, and FIG. 2B illustrates a planar chamfer.

DESCRIPTION OF EMBODIMENTS

A ball socket structure of an embodiment of the disclosure will be described below.

Figure 4:
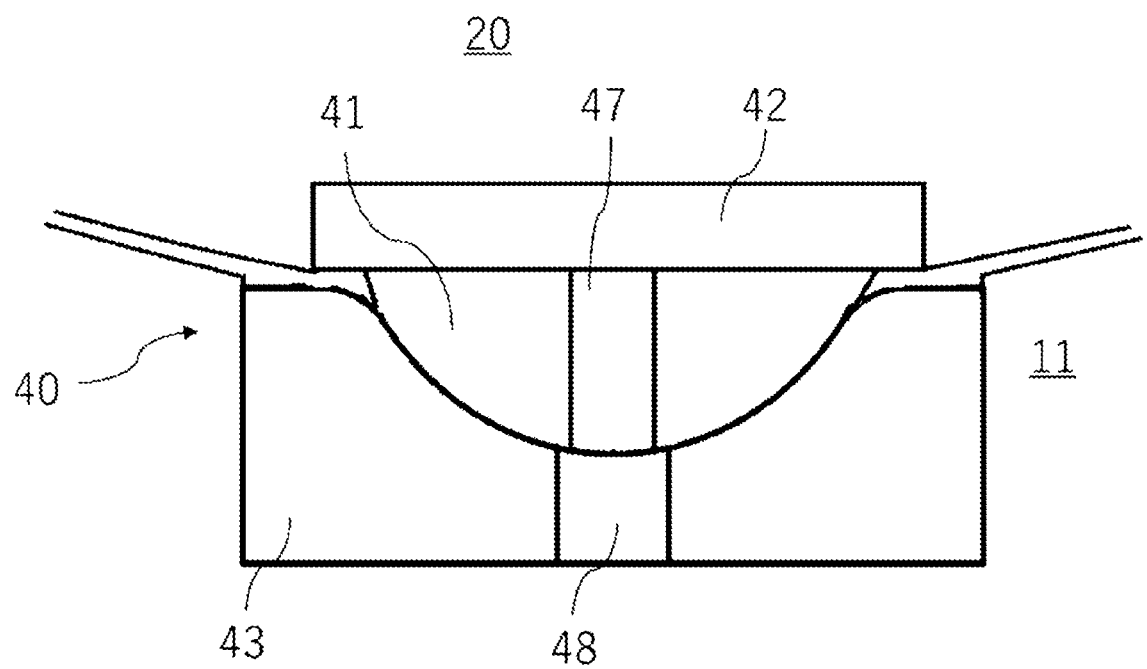
FIG. 4 is a cross-sectional view illustrating a tilting pad bearing 40 having the ball socket structure.

The ball socket structure of the embodiment configures a tilting pad bearing 40 (see FIG. 4).

Figure 5:
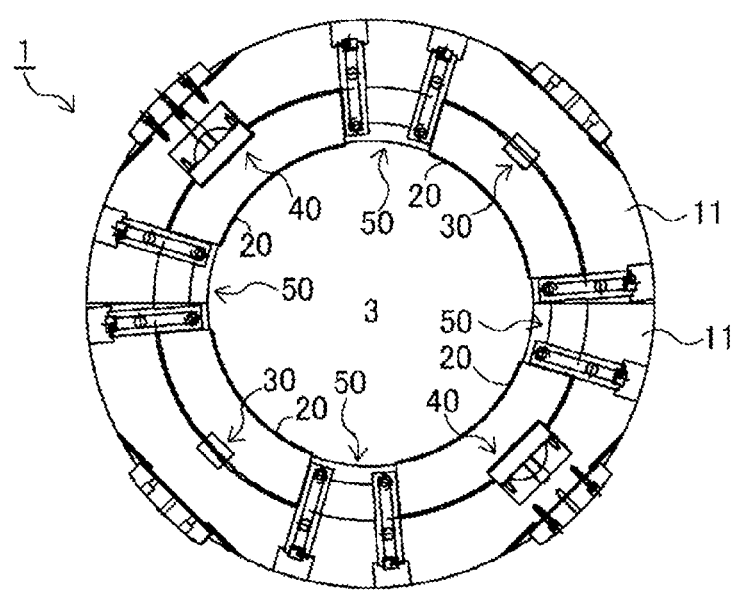
FIG. 5 is a transverse cross-sectional view of a journal bearing 1 having the tilting pad bearing 40 of FIG. 4.
Figure 6:
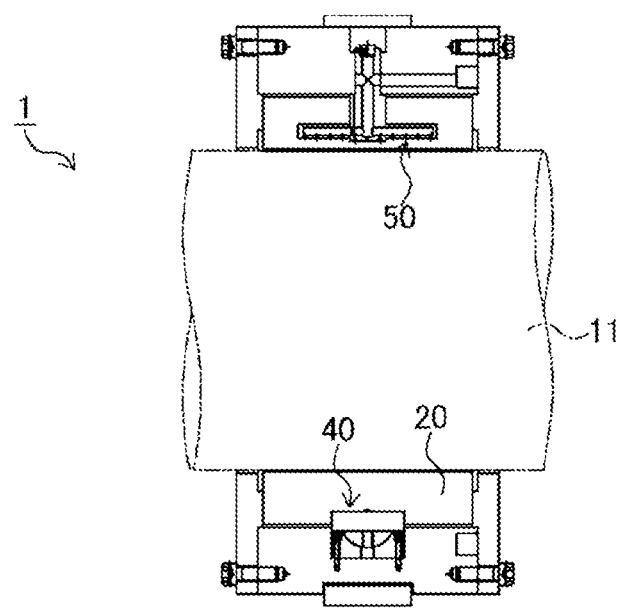
FIG. 6 is also a vertical cross-sectional view of the journal bearing 1.

As illustrated in FIGS. 5 and 6, the tilting pad bearing 40 is placed into a journal bearing 1.

The journal bearing 1 includes housings 11, 11 shaped like half cylinders and four pads 20 disposed on the inner circumferential surfaces of the housings 11, 11. Reference sign 3 denotes a rotary shaft, and reference sign 50 denotes an oil supply portion.

The pads 20 are disposed on the housings 11, 11 via the tilting pad bearings 40 and second tilting pad bearings 30 illustrated in FIG. 4. Each second tilting pad bearing 30 includes a liner disposed on the pad 20 and a spherical pivot disposed in the housing 11.

The ball socket structure of the embodiment can also be applied to a tilting pad thrust bearing.

The tilting pad bearing 40 includes a ball portion 41 and a socket portion 43.

Figure 1A:
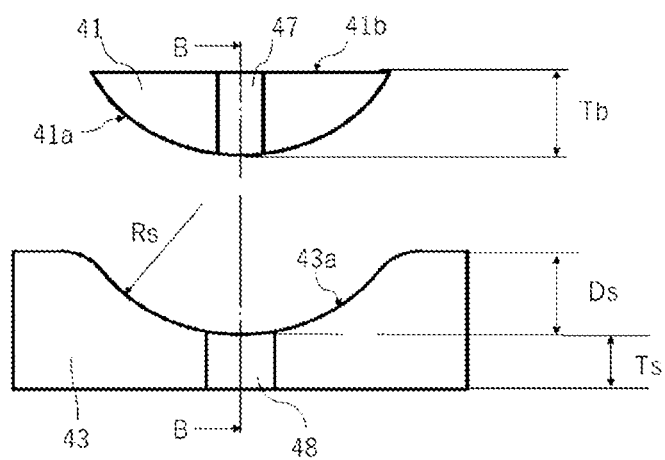
FIG. 1A is an exploded cross-sectional view of a ball socket structure according to an embodiment of the disclosure.
Figure 1B:
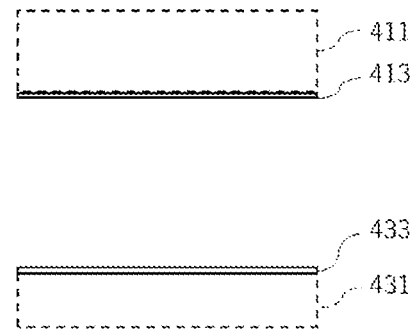
FIG. 1B is a cross-sectional view taken along line B-B highlighting a PVD coating layer.

The ball portion 41 includes a base 411 and a PVD coating layer 413 (see FIG. 1B).

The base 411 is formed as a part of a sphere having a radius of curvature Rs and includes a convex spherical surface and an attachment portion 41b with a flat surface. A through hole 47 is bored through the center of the base 411. The material of the base 411 is not particularly limited as long as the material is rigid enough so that it does not deform or break under force acting on the pad 20. For example, a general bearing metal such as high-chromium carbon steel can be used.

The attachment portion 41b and an anchor member 42 are provided in a slidable state with one another, and the anchor member 42 is embedded in the pad 20.

The PVD coating layer 413 is formed on the convex spherical surface of the base 411. The convex spherical surface of the base 411 with such a PVD coating corresponds to a sliding surface 41a of the ball portion 41, meaning that the sliding surface 41a is made of the PVD coating layer 413.

The PVD coating layer 413 has a higher lubricity than that of the material of the base 411. In other words, the material forming the PVD coating layer 413 has a lower coefficient of friction than that of high-chromium carbon steel or similar material that forms the base 411. This reduces wear on the sliding surface 41a of the ball portion 41, and thus wear on a sliding surface 43a of the socket portion 43.

The socket portion 43 includes a base 431 and a PVD coating layer 433 (see FIG. 1B).

A concave spherical surface is formed on the base 431. This concave spherical surface has the same radius of curvature Rs as the sliding surface 41a (convex spherical surface) of the ball portion 41. The material of the base 431 is not particularly limited as long as the material is rigid enough so that it does not deform or break under force acting on the pad 20. For example, a general bearing metal such as high-chromium carbon steel can be used.

The PVD coating layer 433 is layered on the concave spherical surface of the base 431. The concave spherical surface of the base 431 with such a PVD coating corresponds to the sliding surface 43a of the socket portion 43, meaning that the sliding surface 43a is made of the PVD coating layer 433.

A through hole 48 is bored through the center of the socket portion 43. The through hole 48 is continuous with the through hole 47 of the ball portion 41. The anchor member 42 is fitted into and secured to the pad 20. The amount of movement of the pad 20 can be measured by a measuring device inserted in the through holes 48, 47. The clearance between the shaft 3 and the bearing diameter in the journal bearing 1 can be measured from the amount of movement.

A solid lubrication layer (for example, DLC coating layer) may be layered on the surface of the attachment portion 41b of the ball portion 41 and/or the surface of the anchor member 42, with the ball portion 41 and the anchor member 42 being portions that slide against one another.

A recessed portion for collecting lubricating oil may be formed in the sliding surface of the ball portion 41 and/or the sliding surface of the socket portion 43.

The PVD coating layers 413 and 433 will be described below.

To form a coating layer on a base made of high-chromium carbon steel via a PVD process, plasma cleaning needs to be performed on the process-target surface (coating layer growth surface) of the base.

Thus, in a case where a sputtering method is selected as the PVD process, the base 411 of the ball portion 41 or the base 431 of the socket portion 43 is set at the negative electrode of the sputtering device, and argon particles generated via plasma are caused to collide with the convex spherical surface of the base 411 or the concave spherical surface of the base 431. Thereafter, the coating source material is set in the sputtering device, and the coating material is deposited via vapor deposition onto the process-target surface. In this case, the process-target surfaces are the convex spherical surface of the base 411 of the ball portion 41 and the concave spherical surface of the base 431 of the socket portion 43.

In a case where a general ion plating method or other method different to sputtering is used as the PVD process, the same process is followed.

It is assumed that, when such a PVD process is performed, the entire surface of the process-target surface is given a uniform electric field intensity across the entire surface when the process-target surface of the base set at the negative electrode is uniformly cleaned via plasma cleaning and the coating material is uniformly deposited via vapor deposition.

Here, the electric field at the convex spherical surface, which is the process-target surface of the base 411 of the ball portion 41, tends to be uniform. Thus, the coating layer can be uniformly layered using a general PVD process.

However, at the concave spherical surface, which is the process-target surface of the base 431 of the socket portion 43, the electric lines of force running out perpendicular from the surface interfere with one another, which cancels out the electric field intensity on the concave spherical surface and results in non-uniform intensity. In particular, there is a large disturbance in the electric field at a bottom portion of the concave spherical surface. As a result, it may be difficult to deposit the coating material via vapor deposition on the bottom portion or, if the coating material is deposited, adhesion may be poor.

Thus, in the art, there has not been a socket portion including the sliding surface 43a made of a PVD coating layer.

The present inventors conducted diligent research in order to give the bottom portion of the concave spherical surface an electric field of the same intensity as that of other portions, and the following findings were obtained. That is, when the concave spherical surface of the socket portion 43 is designed as follows, the intensity of the electric field is stable even at the bottom portion of the concave spherical surface of the base 431 of the socket portion 43, and the PVD coating layer 433 can be uniformly layered until the bottom portion with strong adhesive strength with the base 431.

A design condition includes: a value (Ds/Rs) of the ratio between a depth Ds of the concave spherical surface of the base 431 of the socket portion 43 and the radius of curvature Rs being from 0.05 to 0.70.

By making the concave spherical surface shallow in this manner, interference of the electric lines of force running out from the concave spherical surface is reduced, disturbance in the electric field at the bottom portion of the concave spherical surface is suppressed, and sufficient energy is applied to particles that collide with the bottom portion of the concave spherical surface.

According to the research of the present inventors, it was found that by chamfering the outer periphery of the concave spherical surface under the following conditions in addition to setting the value (Ds/Rs=from 0.05 to 0.70) of the ratio as described above, the PVD coating layer 433 forming the sliding surface 43a is made uniform and adhesion to the base 431 is enhanced. This is because, by removing the edge from the outer periphery of the concave spherical surface, which is the process-target surface, disturbance in the electric field caused by an effect known as the edge effect can be suppressed.

Figure 2A:
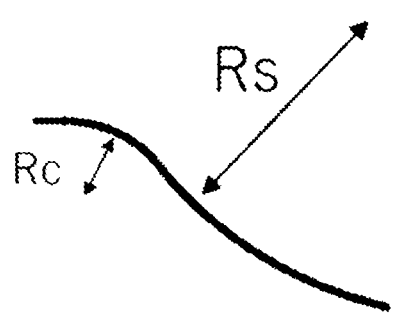
FIGS. 2A and 2B are enlarged views illustrating a portion of the outer periphery (chamfered portion) of a sliding surface of a socket portion.

In other words, the value (Rc/Rs) of the ratio between the radius of curvature Rs of the concave spherical surface and a chamfer radius of curvature Rc of the chamfered outer periphery is 0.02 or greater (see FIG. 2A).

Figure 2B:

Alternatively, the value (Dc/Rs) of the ratio between the radius of curvature Rs and a depth Dc of the chamfered surface may be 0.02 or greater (see FIG. 2B). In this case, a chamfer angle Ac is 60 degrees or less.

By forming the through hole 48 in the bottom portion of the concave spherical surface of the base 431, the electric lines of force spread out to the space of the through hole 48, and thus, the electric field on the concave spherical surface at the peripheral edge of an opening portion 48c of the through hole 48 can be strengthened. Thus, stronger energy is provided to the particles colliding with the bottom portion of the concave spherical surface.

Figure 3:
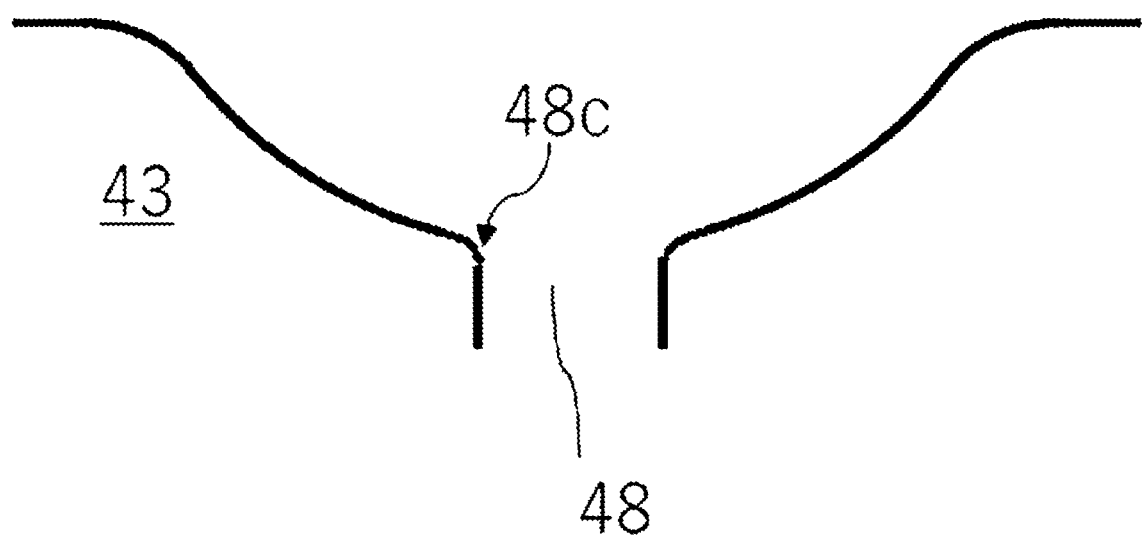
FIG. 3 is a partial enlarged view illustrating a through hole formed in a central portion of the sliding surface of the socket portion.

The peripheral edge of the opening portion 48c of the through hole 48 is preferably chamfered in a similar manner to the outer periphery of the concave spherical surface (see FIG. 3).

In the description above, parameters (Rs, Rc) relating to the radius of curvature of the elements are described in reference to a base of a socket portion that does not include a PVD coating layer. However, whether or not a PVD coating layer is provided is relatively inconsequential to the value of the ratio between the radiuses of curvature. Thus, the disclosure of a ball socket structure in which a socket portion includes a PVD coating layer can be described using parameters having the same values.

Examples

Examples and Comparative Examples of the disclosure will be described below.

The base of the ball portion 41 and the base of the socket portion 43 according to the Examples and Comparative Examples were formed by being cut out from a bulk of high-chromium carbon steel.

In the Examples and Comparative Examples, the ball portion 41 and the socket portion 43 had the following specifications.

Wall thickness at central portion of ball portion 41: Tb=from 6 to 30 mm

Wall thickness at central portion of socket portion 43: Ts=from 5 to 10 mm

Thickness of PVD coating layer 433: from 0.1 to 10 μm

Depth Ds of sliding surface 43a formed of concave spherical surface of socket portion 43=from 5 to 25 mm Radius of curvature Rs of sliding surface 43a: from 10 to 45 mm Chamfer radius of curvature Rc of outer periphery of sliding surface 43a=from 1 to 5 mm (same applies to depth Dc)

Thickness of PVD coating layer 413 of ball portion 41 is the same as that of socket portion 43.

In the Examples and Comparative Examples, bases were formed while changing the specifications of the elements described above, and a PVD coating layer was layered on each base.

The conditions under which plasma cleaning of the concave spherical surface of the base 431 was performed are as follows.

Bias voltage: 500 V, pressure: 0.2 Pa, gas: Ar, duration: 40 min.

After cleaning, a Cr layer was deposited via vapor deposition as a primer layer on the entire surface of the concave spherical surface under the following conditions.

Target: Cr, output: 1.8 kw, bias voltage: 100 V, pressure: 0.5 Pa, gas: Ar, duration: 23 min.

A coating layer was vapor-deposited via sputtering on the primer layer under the following conditions.

For DLC, target: graphite, output: 2.8 kw, bias voltage: 100 V, pressure: 0.5 Pa, gas: $Ar:CH_4$=1:1, duration: 300 min.

For CrN, target: Cr, output: 1.8 kw, bias voltage: 100 V, pressure: 0.5 Pa, gas: $Ar:N_2$=1:1, duration: 300 min.

The pad 20 was connected to the ball portion 41 of the ball socket structure of the Examples and Comparative Examples to form the tilting pad bearing 40 illustrated in FIG. 4. The material of the pad 20 was a bi-metal material such as white metal, polyetheretherketone (PEEK), polytetrafluoroethylene (PTFE), or the like (specifically, a bi-metal using white metal, PEEK, PTFE, or the like as the sliding layer and steel or the like as the backing metal).

The journal bearing 1 illustrated in FIGS. 5 and 6 was configured with these tilting pad bearings 40. The diameter of the shaft 3 was 170 mm.

The housing 11 of the journal bearing 1 was fixed and then the shaft 3 was rotated at 8000 rpm with a bearing surface pressure of 3 MPa.

The conditions and results of the Examples and Comparative Examples are listed in Table 1.

TABLE 1

| | Ds/Rs | Rc/Rs or Dc/Rs | Material of PVD coating layer | Thickness of PVD coating layer in socket portion (%) | Thickness of PVD coating layer in ball portion (%) | Coefficient of friction | Peeling ratio (%) |
|---|---|---|---|---|---|---|---|
| Example 1 | 0.70 | 0.015 | CrN | 0.4000 | 0.4000 | 0.19 | 30 |
| Example 2 | 0.05 | 0.015 | CrN | 0.0005 | 0.4000 | 0.19 | 30 |
| Example 3 | 0.40 | 0.015 | CrN | 0.3000 | 0.4000 | 0.13 | 10 |
| Example 4 | 0.40 | 0.015 | CrN | 0.0050 | 0.4000 | 0.13 | 10 |
| Example 5 | 0.40 | 0.030 | CrN | 0.2500 | 0.4000 | 0.13 | 0 (no peeling) |
| Example 6 | 0.40 | 0.030 | DLC | 0.2500 | 0.0004 | 0.08 | 0 (no peeling) |
| Example 7 | 0.40 | 0.030 | DLC | 0.2500 | 0.3000 | 0.05 | 0 (no peeling) |
| Example 8 | 0.40 | 0.030 | DLC | 0.2500 | 0.0010 | 0.05 | 0 (no peeling) |
| Example 9 | 0.40 | 0.030 | DLC | 0.0250 | 0.0150 | 0.05 | 0 (no peeling) |
| Comparative Example 1 | 0.04 | 0.015 | CrN | 0.4000 | 0.4000 | 0.20 | 60 |
| Comparative Example 2 | 0.80 | 0.015 | CrN | 0.4000 | 0.4000 | 0.20 | 60 |

The coefficient of friction in Table 1 was calculated from the eccentricity of the axial center.

The peeling ratio (%) is the ratio of the area of the PVD coating layer that peeled off from the sliding surface 43a of the socket portion 43 after rotating the shaft 3 for two hours. This peeling ratio is obtained by capturing a planar image of the sliding surface 43a and performing image processing on the obtained image.

By comparing the results of Examples 1 and 2 and Comparative Examples 1 and 2 of Table 1 for the coefficient of friction and the peeling ratio, it can be seen that the value (Ds/Rs) of the ratio between the depth Ds of the sliding surface, which is the concave spherical surface of the socket portion, and the radius of curvature Rs of the sliding surface is preferably from 0.05 to 0.70.

By comparing the results of Examples 4 and 5 for the coefficient of friction and the peeling ratio, it can be seen that the outer periphery of the sliding surface of the socket portion is preferably chamfered, and the value (Rc/Rs or Dc/Rs) of the ratio between the chamfer radius of curvature Rc and the radius of curvature Rs of the sliding surface is preferably 0.02 or greater.

By comparing the results of Examples 1 and 2 and Examples 3 and 4 for the coefficient of friction and the peeling ratio, it can be seen that the thickness (%) of the PVD coating layer at the central portion of the socket portion is preferably from 0.0010 to 0.3000.

By comparing the results of Example 6 and Examples 7 to 9 for the coefficient of friction, it can be seen that the thickness (%) of the PVD coating layer at the central portion of the ball portion is preferably from 0.0010 to 0.3000.

The disclosure is not limited in any way to the description of the embodiments and examples of the disclosure described above. Various variations that can be easily conceived by one skilled in the art and that do not fall outside of the scope of the claims are also included in the disclosure.

While preferred embodiments of the disclosure have been described above, it is to be understood that variations and modifications will be apparent to those skilled in the art without departing from the scope and spirit of the disclosure.

The scope of the disclosure, therefore, is to be determined solely by the following claims.

The invention claimed is:

1. A ball socket structure, comprising:
    a ball portion; and
    a socket portion,
    the ball portion and the socket portion being configured to slide against one another, wherein
    the socket portion comprises a sliding surface including a PVD coating layer,
    the sliding surface of the socket portion is a concave spherical surface, and
    a value (Ds/Rs) of a ratio between a depth Ds of the sliding surface and a radius of curvature Rs of the sliding surface is from 0.05 to 0.70.

2. The ball socket structure according to claim 1, wherein the sliding surface of the socket portion comprises a chamfered outer periphery.

3. The ball socket structure according to claim 2, wherein a value (Rc/Rs) of a ratio between the radius of curvature Rs of the sliding surface and a chamfer radius of curvature Rc of the chamfered outer periphery or a value (Dc/Rs) of a ratio between the radius of curvature Rs and a depth Dc of chamfered surface is 0.02 or greater.

4. The ball socket structure according to claim 1, wherein the socket portion comprises a through hole formed in a central portion of the socket portion.

5. The ball socket structure according to claim 4, wherein the through hole comprises a chamfered opening portion peripheral edge.

6. The ball socket structure according to claim 1, wherein the PVD coating layer comprises diamond-like carbon.

7. The ball socket structure according to claim 1, wherein the PVD coating layer has a thickness of from 0.0010 to 0.3000% of a wall thickness Ts of a central portion of the socket portion.

8. The ball socket structure according to claim 1, wherein
the ball portion comprises a sliding surface including a PVD coating layer, and
the PVD coating layer has a thickness of from 0.0010 to 0.3000% of a wall thickness Tb of a central portion of the ball portion.

9. A tilting pad bearing, comprising:
the ball socket structure according to claim 1.

10. A journal bearing, comprising:
the tilting pad bearing according to claim 9.

11. A thrust bearing, comprising:
the tilting pad bearing according to claim 9.

12. A manufacturing method for a socket portion of a ball socket structure including a ball portion and the socket portion, the ball portion and the socket portion being configured to slide against one another, the method comprising:
preparing a base of a socket portion made of metal, the base including a concave spherical surface as a sliding surface and having a value (Ds/Rs) of a ratio between a depth Ds of the concave spherical surface and a radius of curvature Rs of the concave spherical surface of from 0.05 to 0.70;
performing first preprocessing of plasma cleaning the concave spherical surface of the base;
performing second preprocessing of layering a primer layer on the concave spherical surface that is plasma-cleaned via a PVD process; and
layering diamond-like carbon on the primer layer via a PVD process.

13. The manufacturing method according to claim 12, wherein
in the preparing, the concave spherical surface of the base comprises a chamfered outer periphery.

14. The manufacturing method according to claim 13, wherein
a value (Rc/Rs) of a ratio between the radius of curvature Rs of the concave spherical surface and a chamfer radius of curvature Rc of the chamfered outer periphery or a value (Dc/Rs) of a ratio between the radius of curvature Rs and a depth Dc of chamfered surface is 0.02 or greater.

15. The manufacturing method according to claim 12, wherein
in the preparing, the concave spherical surface comprises a through hole formed in a central portion of the concave spherical surface.

16. The manufacturing method according to claim 15, wherein
the through hole comprises a chamfered peripheral edge.

17. The manufacturing method according to claim 12, wherein
in the layering, the layer of diamond-like carbon is given a thickness of from 0.0010 to 0.3000% of a wall thickness Ts of a central portion of the socket portion.

18. A manufacturing method for a ball socket structure, comprising:
preparing a socket portion manufactured using the manufacturing method according to claim 12;
preparing a ball portion;
placing the ball portion in the socket portion.

19. A manufacturing method for a socket portion of a ball socket structure including a ball portion and the socket portion, the ball portion and the socket portion being configured to slide against one another, the method comprising:
preparing a base of a socket portion made of metal, the base including a concave spherical surface as a sliding surface and having a value (Ds/Rs) of a ratio between a depth Ds of the concave spherical surface and a radius of curvature Rs of the concave spherical surface of from 0.05 to 0.70; and
layering a solid sliding layer on the concave spherical surface by performing a PVD process.

20. The manufacturing method according to claim 19, wherein
in the preparing, the concave spherical surface comprises a through hole formed in a central portion of the concave spherical surface.

* * * * *